Aug. 11, 1964  M. J. GLAUBER  3,144,042
COLLAPSIBLE TYPE CARTRIDGE VALVE
Filed May 1, 1961
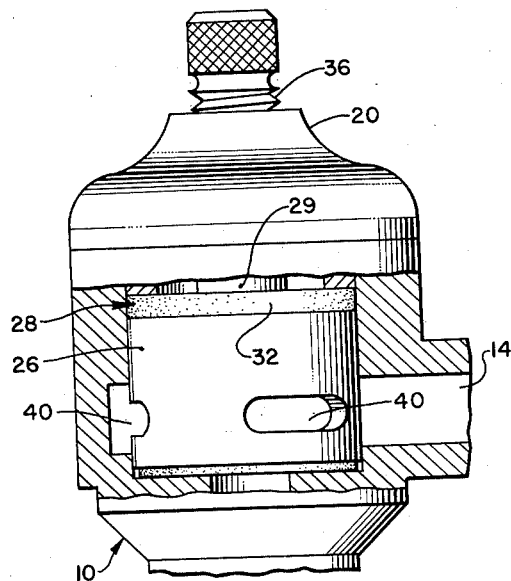
FIG. 1.
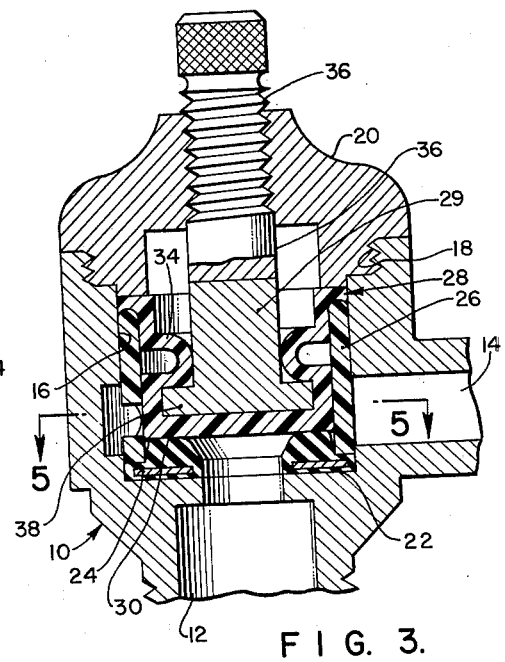
FIG. 2.
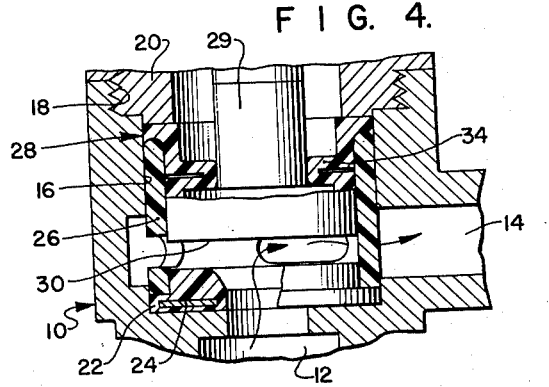
FIG. 4.
FIG. 3.
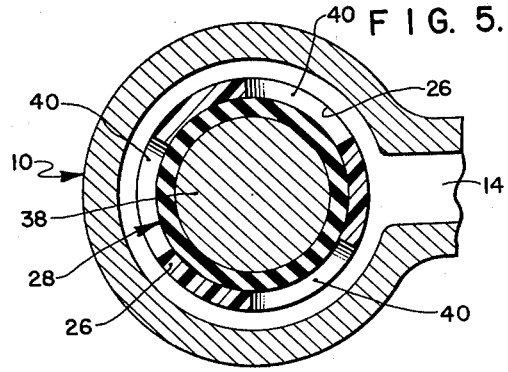
FIG. 5.
INVENTOR.
MYRON J. GLAUBER
BY Lyon & Lyon
ATTORNEYS

United States Patent Office 3,144,042
Patented Aug. 11, 1964

3,144,042
COLLAPSIBLE TYPE CARTRIDGE VALVE
Myron J. Glauber, 6399 Wilshire Blvd.,
Los Angeles 48, Calif.
Filed May 1, 1961, Ser. No. 106,831
4 Claims. (Cl. 137—454.6)

This invention relates to an improved valve construction.

It is an object of this invention to provide a valve construction wherein the usual sources of difficulty such as, for example, the stem packing, usual bibb-washer and screw, and similar difficulties are eliminated.

A further object of this invention is to provide a valve structure wherein no screw threaded stem is exposed to water.

A further object of this invention is to provide a valve having a novel closure therein insuring long and efficient operation and eliminating any possible pitting, corroding or wire-drawing of the valve seat.

Still a further object of this invention is to provide a valve wherein finished machining of the inside of the valve body is unnecessary.

Still a further object of this invention is to provide a valve wherein the operative elements can be inserted as a cartridge or single unit into and removed from the valve housing.

Still a further object of this invention is to provide such a cartridge insertable into the housing in such a manner as to seal off possible leakage through the housing.

Other objects and advantages will be readily apparent from the following description:

In the drawings:

FIGURE 1 is a side elevation with the valve body partially broken away.

FIGURE 2 is a side elevation in section with the valve in the closed position.

FIGURE 3 is a perspective of the valve components with parts thereof broken away.

FIGURE 4 is a view similar to FIGURE 2 with the valve in the open position.

FIGURE 5 is a view taken along line 5—5 of FIGURE 2.

The valve housing 10 may be formed in the customary manner having an inlet 12 and a spout outlet 14. The body has a bore 16 formed therein to receive the valve and has an internally threaded opening 18 at its top to receive threaded bonnet 20.

The valve assembly comprises a valve seat 22 having a reinforcing ring 24 embedded therein. A cage member 26 is open at both ends and in this embodiment is cylindrical in shape abutting valve seat 22 thereby clamping the valve seat in place and eliminating the necessity for a precision finished surface at the innermost extremity of bore 16.

Fitting within cage 26 is the valve element 28 having a valve or sealing surface 30 at its lowermost extremity adapted to contact valve seat 22 and shut off flow through the valve. The valve element 28 has at its uppermost extremity a flange 32 projecting outwardly and overlying the uppermost edge of cage 26 being clamped between cage 26 and bonnet 20 upon assembly of the faucet to secure the valve element in place. Such clamping urges the periphery of the flange against the body to make a fluid tight seal.

Formed in valve element 28 between flange 32 and valve surface 30 is an inturned fold 34 which permits compression of the valve element thereby eliminating stretching or distortion of valve element 28. A threaded valve stem 36 projects through bonnet 20 and abuts and swivels upon element 29 which element has an enlarged disc 38 formed thereon which fits within valve element 28 beneath fold 34. A valve handle (not shown) is utilized to turn stem 36 thereby moving same relative to bonnet 20 towards element 29 lowering the valve surface 30 relative to the valve seat to close the valve. When stem 36 is rotated to move away from element 29 water pressure against surface 30 raises valve element 28 to open the valve thereby tending to compress fold 34 as seen in FIGURE 4.

The cage 26 is provided with one or more openings 40 immediately above seat 22 through which water flows to outlet 14 when the valve surface 30 is moved away from valve seat 22. The size and number of openings 40 should be related to the cross-sectional area of inlet 12 to produce a back pressure within the cage 26 to insure uninterrupted flow.

The valve seat 22 and valve element 28 are preferably formed of neoprene or other suitable resilient material of substantially the same shore-hardness thereby eliminating wire-cutting, pitting and other sources of difficulties in the usual valve or water faucet.

The valve element 28 when molded, is preferably in a relaxed or unstressed condition when engaging the valve seat inasmuch as the valve is normal in the closed position when in use and this will enhance its longevity. It is only when the valve is open and the valve element and its fold are in a compressed state that it is conceivably subject to the slightest strain.

While what hereinbefore has been described as the preferred embodiment of this invention, it is readily apparent that alterations and modifications may be restored to without departing from the scope of this invention and such alterations and modifications are intended to be included within the scope of the appended claims.

I claim:

1. A valve comprising: a housing having a bore therein and both an inlet and an outlet communicating with said bore, said inlet being at one end of said bore, and the other end of said bore being open, a resilient valve seat insertable into said bore surrounding said inlet, a cage received within said bore and in engagement with said valve seat, said cage having one or more openings therein permitting flow therethrough, a collapsible, resilient valve element received within said cage, and having a seating surface on one end, said seating surface being engageable with said seat when said valve element is in a relaxed condition, said valve element having a peripheral flange on the end thereof opposite said seating surface, said flange overlapping said cage, said valve element further having fold means therein to facilitate collapsing thereof in response to inlet flow pressure acting on said seating surface, a member detachably secured within the other end of said bore, said member engaging said flange and clamping said cage, said valve element and said seat in position, whereby to form a sealed unit closed except for said inlet and said one or more flow openings, and means projecting through said member and engageable with the said valve element on the back side of said seating surface, and operable to secure said seating surface on said valve element in engagement with said seat.

2. A valve as recited in claim 1, wherein said valve seat is provided with a reinforcing ring.

3. A valve as recited in claim 1, wherein said seat and said valve element have approximately the same hardness.

4. In a valve structure having a housing provided with both an inlet and an outlet, a cartridge assembly insertable into said housing comprising: a tubular cage member having at least one opening in the side wall thereof, a resilient valve seat in contact with and partially received within one end of said cage, a collapsible, resilient, substantially tubular valve element insertable in the other extremity of said cage and closed at one end to define a seating surface engageable with said valve seat, said collapsible valve element having fold means in the side wall thereof, said valve element being formed to be in a relaxed position when said seating surface is in engagement with said valve seat, and said valve element being collapsible from a position wherein said seating surface contacts said seat, to a position where said seat is in communication with said one opening, and an integral peripheral flange on the end of said valve element opposite said seating surface, said flange overlapping and being in engagement with the other end of said cage.

References Cited in the file of this patent

UNITED STATES PATENTS

| | | |
|---|---|---|
| 1,779,503 | Swindin | Oct. 28, 1930 |
| 2,194,262 | Allen | Mar. 19, 1940 |
| 2,936,777 | Kistner | May 17, 1960 |
| 3,006,361 | Reinemann | Oct. 31, 1961 |

FOREIGN PATENTS

| | | |
|---|---|---|
| 1,067,623 | France | Jan. 27, 1954 |